United States Patent [19]

Shin

[11] Patent Number: 5,535,957
[45] Date of Patent: Jul. 16, 1996

[54] REEL TABLE DRIVING APPARATUS FOR A VIDEO CASSETTE RECORDER

[75] Inventor: Ki-Hoon Shin, Seoul, Rep. of Korea

[73] Assignee: Daewoo Electronics Co., Ltd., Seoul, Rep. of Korea

[21] Appl. No.: 304,060

[22] Filed: Sep. 12, 1994

[30] Foreign Application Priority Data

Sep. 15, 1993 [KR]  Rep. of Korea ................. 1993-18535

[51] Int. Cl.⁶ ................................................ G11B 15/43
[52] U.S. Cl. ................................. 242/355.1; 242/356.7
[58] Field of Search ......................... 242/355, 355.1, 242/356, 356.3, 356.7, 356.5; 360/96.3, 96.4

[56] References Cited

U.S. PATENT DOCUMENTS

| | | | |
|---|---|---|---|
| 3,009,663 | 11/1961 | Armstead | 242/356.7 |
| 3,610,553 | 10/1971 | Matsuyama | 242/355 |
| 3,759,464 | 9/1973 | Sato | 242/356.7 |
| 4,330,098 | 5/1982 | Santoro | 242/356 |
| 4,599,662 | 7/1986 | Iwasaki | 360/96.3 |
| 4,754,347 | 6/1988 | Kodama | 360/85 |
| 4,843,499 | 6/1989 | Ogawa | 360/96.3 |
| 5,295,638 | 3/1994 | Lee | 242/356 |
| 5,372,326 | 12/1994 | Kim | 242/356.6 |

*Primary Examiner*—John P. Darling
*Attorney, Agent, or Firm*—Anderson Kill Olick & Oshinsky

[57] ABSTRACT

A video cassette recorder is provided with a reel table driving apparatus for preventing slackness of a loaded magnetic tape in the switching of the operating mode, which comprises a pair of idlers disposed between a supply reel table and a take-up reel table rotatably mounted to a deck of the recorder, a support plate mounted to the deck for movably supporting the respective idlers, coil springs for biasing the respective idlers upward, a slide plate slidably mounted the deck for causing at least one of the idlers to selectively engage with and disengage from the supply and the take-up reel tables, and a driving mechanism for transmitting its drive force to one of the reel tables through the one of the idlers. The support plate includes a pair of generally curved slots arranged in a substantially opposite relationship with each other, which are adapted to accommodate shafts of the respective idlers therein. The slide plate includes a series of camming faces formed at a lower portion thereof, which are engaged with the shafts of the idlers.

6 Claims, 8 Drawing Sheets

REEL TABLE DRIVING APPARATUS FOR A VIDEO CASSETTE RECORDER

FIELD OF THE INVENTION

The present invention relates to a reel table driving mechanism; and, more particularly, to an apparatus for driving reel tables of a video cassette recorder("VCR"), capable of preventing slackness of a magnetic tape loaded in the VCR during a change of the operating mode.

DESCRIPTION OF THE PRIOR ART

As is well known, a VCR is operable in various modes, e.g., play mode, review mode, rewinding mode and fast forward mode, etc., through the selective operation of the driving mechanism thereof. Usually, the switching of the operating mode is executed by the selective drive of a supply reel table and a take-up reel table of the VCR. In general, such a driving mechanism includes an idler positioned between the supply reel table and the take-up reel table, which is shifted clockwise and counterclockwise to transmit selectively its driving force to one of the reel tables, thereby enabling the VCR to operate in a certain selected mode. However, looseness of a loaded magnetic tape may occur during the conversion to a desired mode of operation due to the delay in the shifting motion of the idler and the inertia moment of the reel tables, which may cause operational failures, noises and/or distortions.

In this regard, various reel table driving mechanisms have been proposed to prevent the slackness of the tape during the switching of the operating mode. For example, U.S. Pat. No. 4,754,347 discloses a brake mechanism for magnetic tape reel mounts in a VCR, which comprises an idler wheel in engagement with one of a first and a second idler engagement portions of a supply reel and a take-up reel mounts, a drive pulley for rotating the idler wheel in a forward or reverse direction, a pair of brakes for simultaneously engaging with and disengaging from a first and a second brake engagement portions of the supply reel and the take-up reel mounts, and a one way clutch connecting the first idler engagement portion to the first brake engagement portion of the supply reel mount. However, in the prior art brake mechanism, the idler wheel is swung toward one of the reel mounts by a driving force of the pulley, thereby entailing the retardation of the shifting operation thereof during the change of modes. This results in the slackness of the magnetic tape loaded in the VCR. Further, such a brake mechanism is provided with the pair of brakes for simultaneously braking the reel mounts, causing the structure of the VCR to become more complicated.

In UK Patent Publication No. 2 239 550, there is provided another tape recorder reel driving system, which can prevent loosening of a loaded tape during the shifting of operation modes, comprising a plurality of intermediate power transmitting devices interposed between an idler and reel discs. Although such a reel driving system may be useful for the intended purpose, it has disadvantages in that the transmitting devices intervened between the idler and the reel discs cause a structural modification of a deck in the VCR; and require a relatively complicated assembling process of the driving system.

A conventional structure of a VCR is schematically shown in FIG. 1, wherein a magnetic tape T drawn out of a loaded cassette 2 in the VCR travels along a given path provided on a deck 4 of the VCR and comes in contact with a head drum 6 to record video information thereon or reproduce recorded information therefrom. As will be described hereinbelow, the VCR comprises reel table driving and braking, mechanisms mounted to the deck 2 in an independent relationship with each other.

FIG. 2 shows a typical reel table driving mechanism commonly employed in the VCR. The driving mechanism includes an idle gear 10 disposed between a supply reel table 12 and a take-up reel table 14, which is swung left and right so as to engage with one of the reel tables 12, 14. The idle gear 10 is supported at a bracket 16 which is rotatably pivoted at a pin 18. A drive gear 20 is rotatably pivoted at the pin 18 and meshed with the idle gear 10. A driving pulley 22 is mounted to a shaft 24 of a capstan motor 26. A driven pulley 28 is rotatably pivoted at the pin 18 and linked to the driving pulley 22 via a belt 30. As a result, a forward or reverse rotation of the capstan motor 26 is transmitted to the driven pulley 28 by the belt 30 to drive the gear 20. At that time, the driving force of the driven pulley 28 causes the bracket 16 to be shifted clockwise or counterclockwise, thereby enabling the idle gear 10 to selectively engage with one of the reel tables 12, 14 so that the VCR operates in a switched mode.

A reel table braking device typically used in the VCR together with the reel table driving mechanism shown in FIG. 2 is depicted in FIG. 3. The braking device comprises a pair of brakes 32 disposed adjacent to the reel tables 12, 14 and urged toward the reel tables by a common coil spring 34 fixed thereto, a slide plate 36 movably mounted to a deck 4 for simultaneously actuating the brakes 32, a swing lever 38 pivoted at an end portion of the slide plate 36, and a cam gear 40 for actuating the swing lever 38 by its rotation. According to the prior art braking device, if it is required to change the operation mode, e.g., from a fast forward or rewind mode to a stop mode, the slide plate 36 is moved in the right direction through the actuation of the swing lever 38 caused by a counterclockwise rotation of the cam gear 40. Therefore, a pin 42 of each brake 32 is engaged with a recess 44 of the slide plate 36 to allow the respective brakes 32 to press the reel tables 12, 14 by a biasing force of the coil spring 34, thereby braking the reel tables 12, 14.

As discussed above, in the typical reel table driving and braking mechanisms, there exists an interval or delay between the driving initiation of the capstan motor 26 and the shifting completion of the idle gear 10 because the idle gear 10 is shifted to one of the reel tables 12, 14 by the drive of the capstan motor 26. As a result, prior to the completion of the idle gear shifting operation, a loaded magnetic tape T in the VCR has been already fed for a substantial length in a certain switched mode and, therefore, becomes loose to cause operational failures, noises, distortions and the like during the switching of the operation modes. Further, the prior art driving device comprises a number of brake parts for braking the reel tables, requiring rather complicated and costly manufacturing process thereof.

SUMMARY OF THE INVENTION

Accordingly, it is an object of the present invention to provide a reel table driving apparatus for a VCR which is capable of concurrently driving a capstan motor and reel tables to prevent a loaded magnetic tape from slackening during the shifting of the operating mode.

It is another object of the present invention to provide a reel table driving mechanism with a pair of idlers which are designed to serve to quickly brake reel tables in the switching operation of a required mode, simplifying the overall structure of a VCR.

The above and other objects of the present invention are accomplished by providing a reel table driving apparatus for a VCR having a supply reel table and a take-up reel table rotatably mounted to a deck of the VCR, which comprises:

a first idler disposed adjacent to the supply reel table for a selective engagement with the supply reel table;

a second idler disposed adjacent to the take-up reel table for a selective engagement with the take-up reel table;

said first and second idlers arranges between the supply reel table and the take-up reel table for a selective engagement with each other and the supply and the take-up reel tables to brake the supply and the take-up reel tables;

a support plate mounted to the deck for supporting said first and second idlers and individually guiding an upward and downward movement of said first and second idlers;

means for biasing said first and second idlers in an upward direction;

a slide plate slidably mounted to the deck for causing at least one of said first and second idlers to selectively engage with and disengage from the supply reel table and the take-up reel table; and means for driving one of the reel tables through said one of the first and the second idlers.

In accordance with a preferred embodiment of the present invention, the support plate includes a pair of generally curved slots provided thereat and arranged in a substantially opposite relationship with each other, which are adapted to accommodate shafts of the first and the second idlers therein. Further, each of the respective curved slots of the support plate serves to guide independently each shaft of the idlers in the upward and downward direction during-the switching of the operation modes. In addition, the slide plate includes a series of camming faces formed at a lower portion thereof, which define various operation mode positions, e.g., stop mode positions, a play and fast forward mode position, a review and rewind mode position, and brake mode positions. Each of the shafts of the idlers lies at one of the mode positions of the camming faces to enable one or both of the idlers to be selectively engaged with one or both of the reel tables by a lateral movement of the slide plate. This results in the switching of a required operation mode.

BRIEF DESCRIPTION OF THE DRAWINGS

The above and other objects, features and advantages of the present invention will become apparent from the following description given in conjunction with the accompanying drawings, in which.

DETAILED DESCRIPTION OF THE PREFERRED EMBODIMENTS

Figure 1:
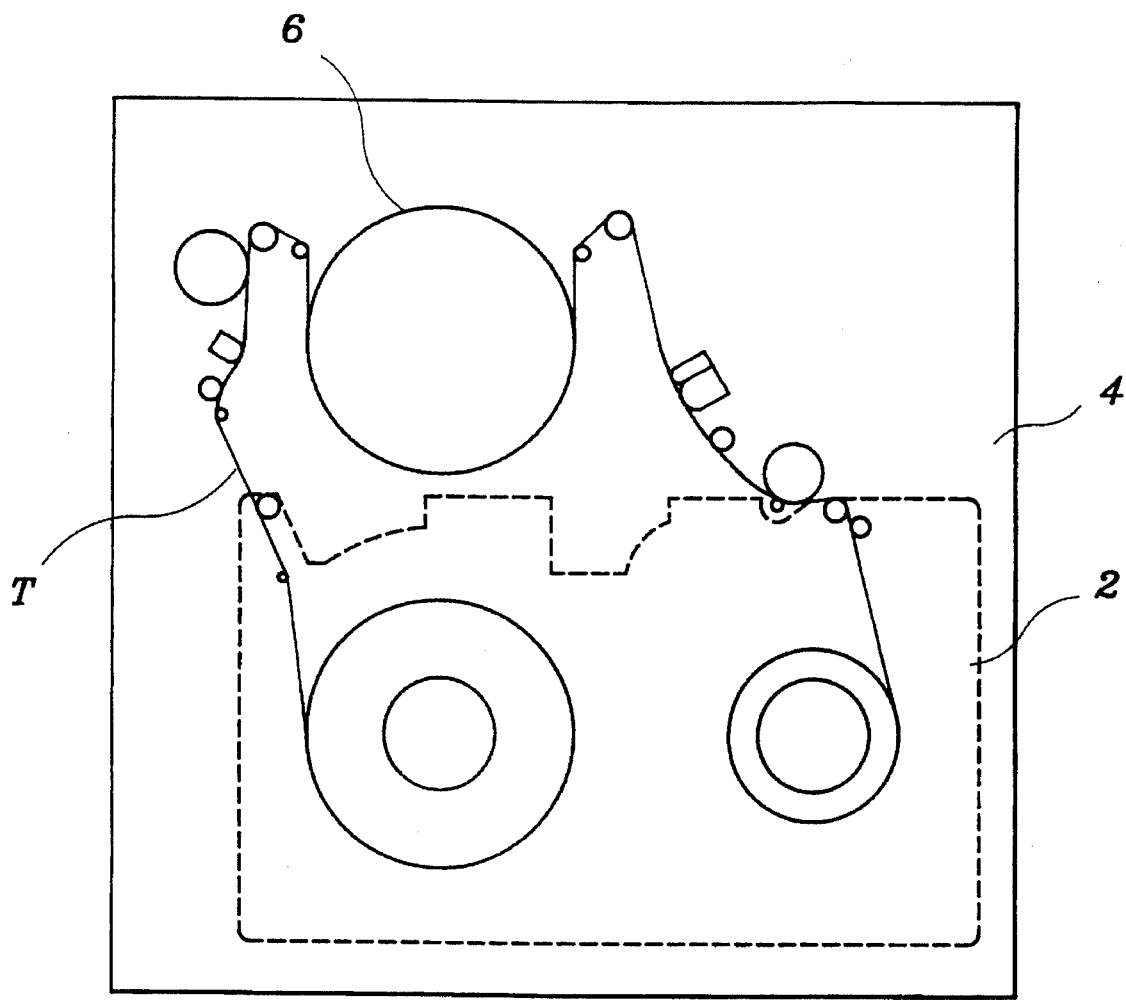
FIG. 1 is a schematic plan view of a typical operating system of a VCR.
Figure 2:
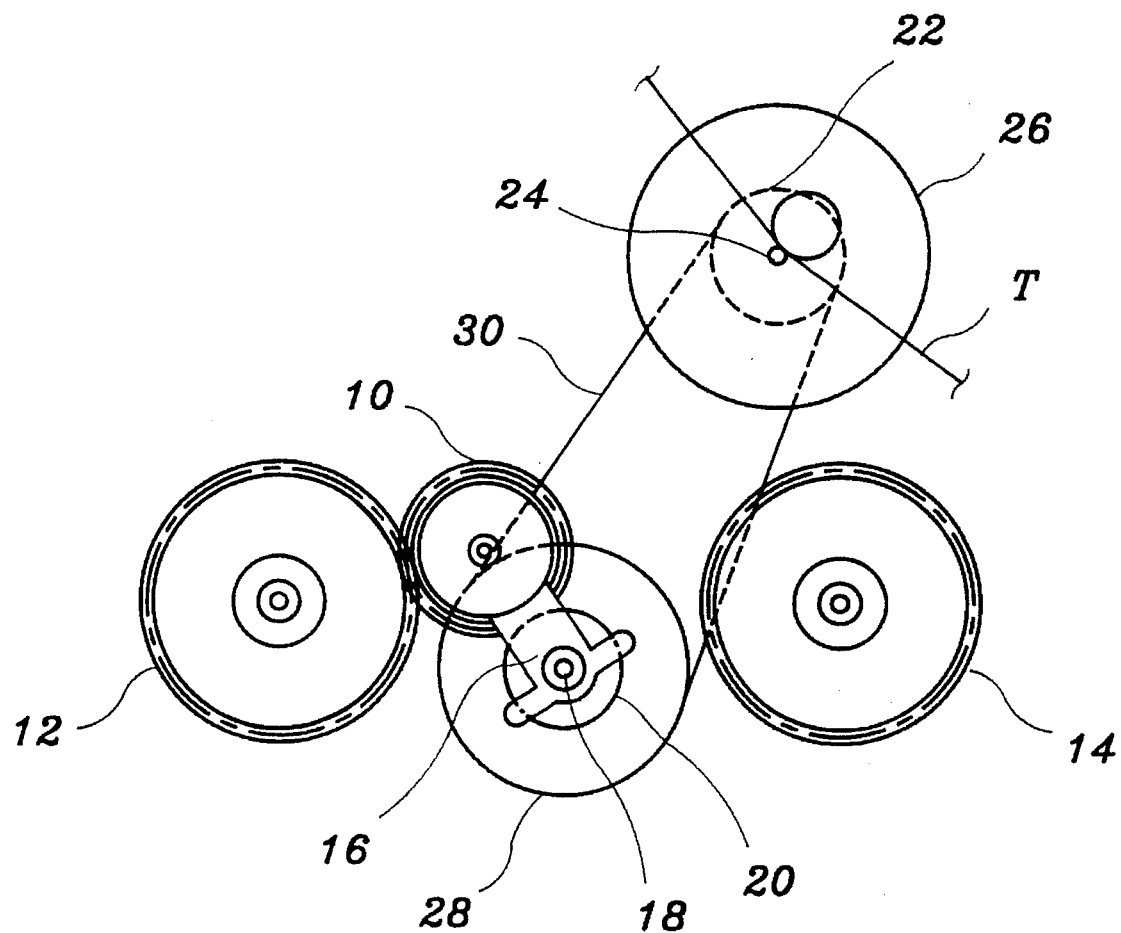
FIG. 2 is a plan view of a prior art reel table driving device commonly employed in the VCR of FIG. 1.
Figure 3:
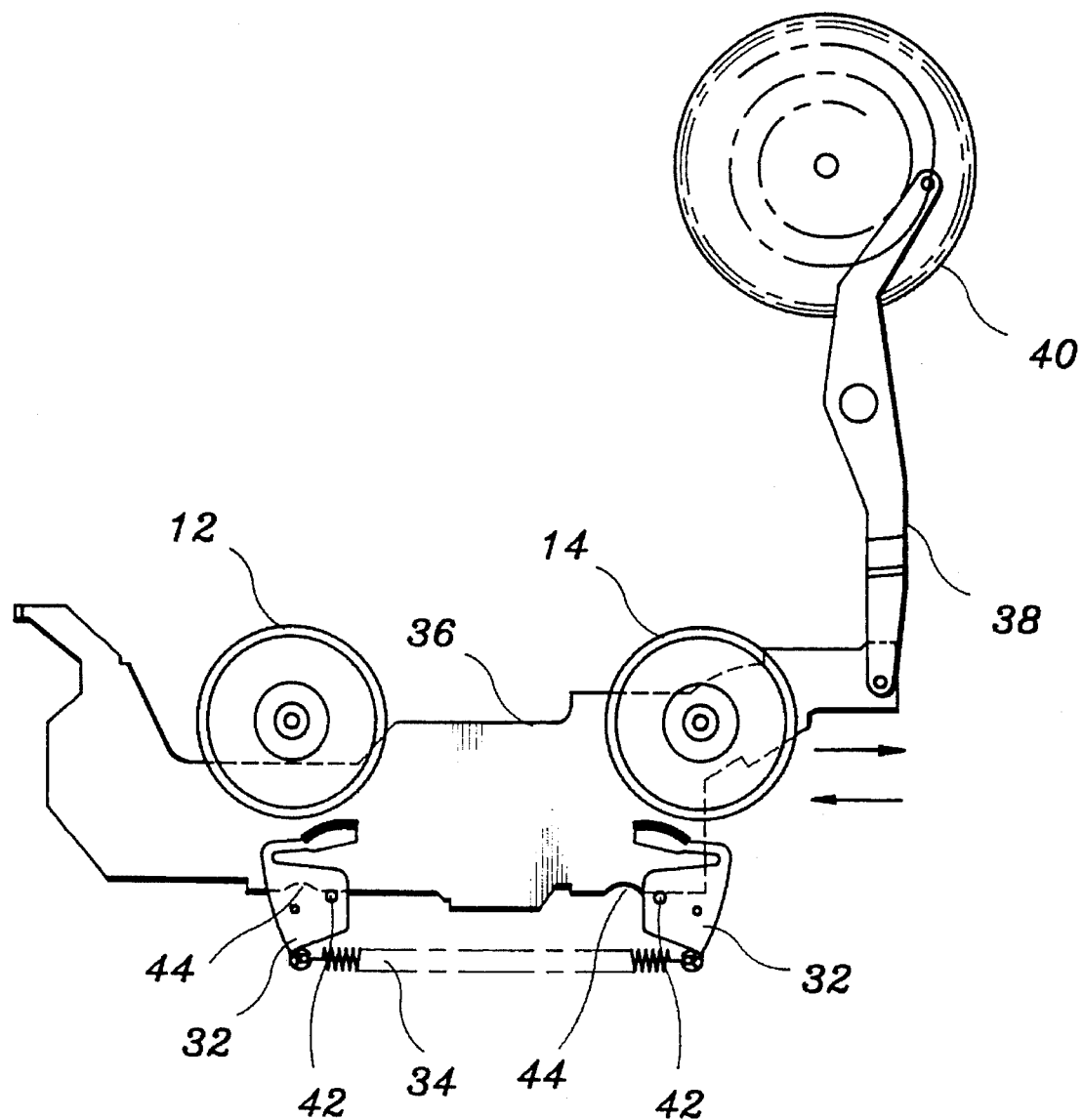
FIG. 3 is a plan view of a typical reel table braking mechanism used in association with the driving device shown in FIG. 2.
Figure 4:
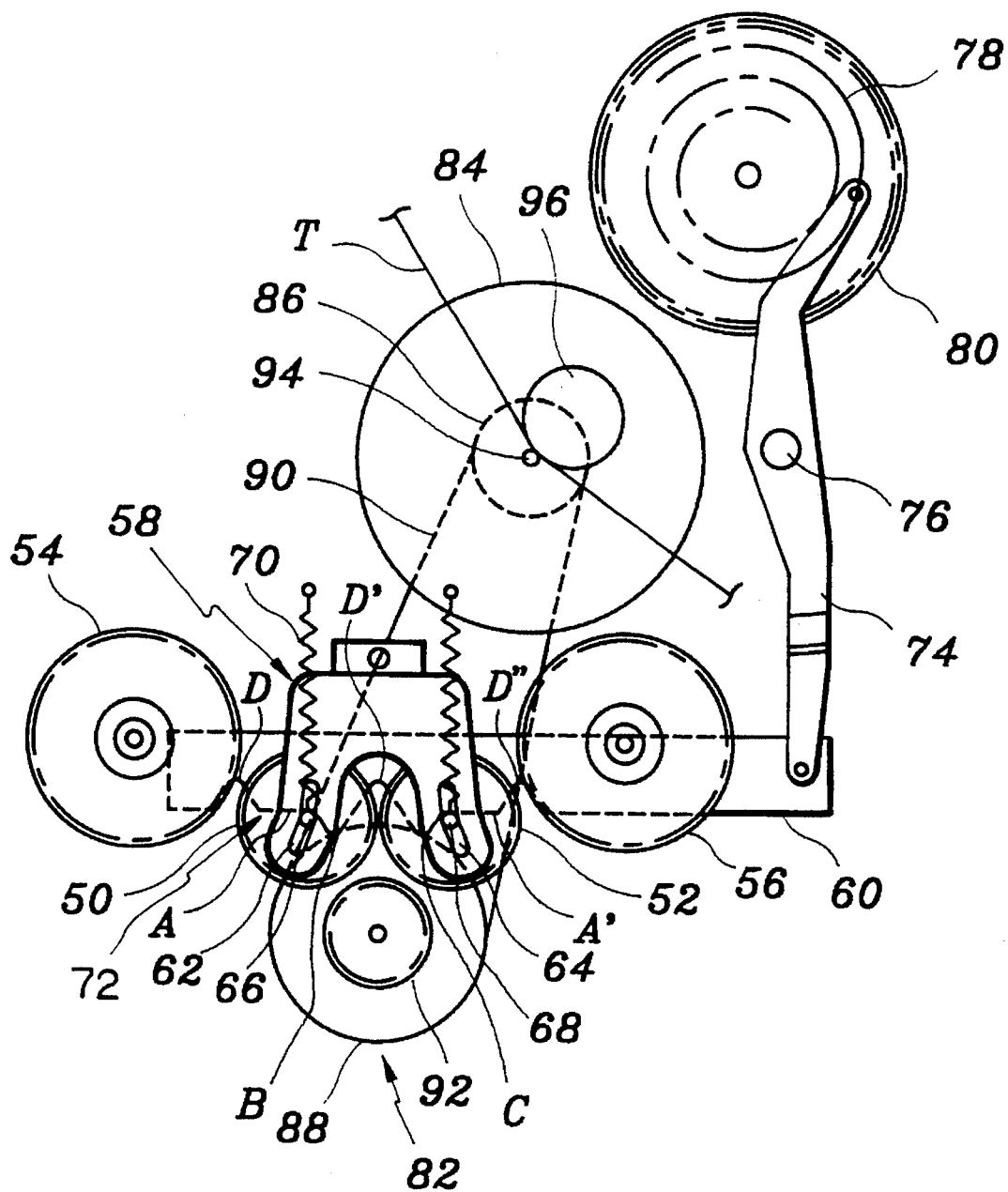
FIG. 4 is a plan view of a reel table driving apparatus of a VCR in accordance with a preferred embodiment of the present invention.

Referring now to FIG. 4, there is shown a reel table driving apparatus for use in a VCR in accordance with a preferred embodiment of the present invention. The reel table driving apparatus comprises a pair of idlers 50, 52 interposed between a supply reel table 54 and a take-up reel table 56 rotatably mounted to a deck of the VCR(not shown), a support plate 58 secured to the deck for supporting movably the idlers 50, 52, and a slide plate 60 slidably mounted to the deck for actuating the idlers 50, 52 associated therewith by its lateral movement.

As best shown in FIG. 4, the first idler 50 and the second idler 52 are disposed adjacent to the supply reel table 54 and the take-up .reel table 56 so that one or both of them are selectively engaged with and disengaged from one or both of the supply and the take-up reel tables 54, 56; and further arranged in a close relationship for a selective engagement with each other as well as the supply and the take-up reel tables 54, 56. The support plate 58 is provided with a pair of generally curved slots 62, 64 arranged in a substantially opposite relationship with each other, which are coupled to shafts 66, 68 of the first and the second idlers 50, 52. The respective curved slots 62, 64 are constructed to individually guide the shafts 66, 68 of the first and the second idlers 50, 52 in an upward and downward direction during the switching of the operating mode. Additionally, fixed to end portions of the shafts 66, 68 of the idlers 50, 52 are coil springs 70 which serve to bias the idlers 50, 52 in the upward direction.

The slide plate 60 is interlinked with the respective shafts 66, 68 of the idlers 50, 52 to independently actuate the idlers 50, 52 through its lateral movement depending on the operating mode of the VCR. Further, the slide plate 60 is provided with a series of camming faces 72 formed at a lower portion thereof, which are adapted to engage with the shafts 66, 68 of the idlers 50, 52. The camming faces 72 of the slide plate 60 are properly designed to define various operation mode positions, e.g., stop mode positions A, A', a review and rewind mode position B, a play and fast forward mode position C, and brake mode positions D, D', D". Accordingly, each of the shafts 66, 68 of the idlers 50, 52 lies at one of the mode positions of the camming faces 72 to thereby enable the one or both of the idlers 50, 52 to selectively engage with and disengage from the one or both of the reel tables 54, 56 through the lateral movement of the slide plate 60 in the switching of the operating mode as will be further explained below. In addition, coupled to a side of the slide plate 60 is a swing lever 74 rotatably pivoted at a pin 76 at a middle portion thereof, which is engaged with a camming groove 78 of a cam gear 80. Therefore, the forward and reverse rotation of the cam gear 80 will cause the swing lever 74 to rotate clockwise and counterclockwise about the pin 76, thereby moving the slide plate 60 in the left and right direction.

As shown in FIG. 4, the reel table driving apparatus is provided with an idler driving mechanism 82 which transmits the driving force from a capstan motor 84 to the one of the idlers 50, 52. The idler driving mechanism 82 includes a driving pulley 86 coupled to a shaft 94 of the capstan motor 84, a driven pulley 88 linked to the driving pulley 86 via a belt 90, and a drive gear 92 associated with the driven pulley 88. The drive gear 92 is arranged in close-proximity to the idlers 50, 52 to selectively engage with said one of the idlers. Therefore, when said one of the idlers 50, 52 is lowered along one of the curved slots 62, 64 of the support plate 58 by the lateral movement of the slide plate 60 during the conversion to a desired operating mode, it will be engaged with said one of the reel tables 54, 56 and the drive gear 92 of the idler driving mechanism 82. As a result, the driving force of the drive gear 92 is transmitted to said one of the reel tables 54, 56 through the lowered idler. On the other hand, a loaded magnetic tape T in the VCR travels along a given path provided between the shaft 94 of the capstan motor 84 and a pinch roller 96.

Figure 5:
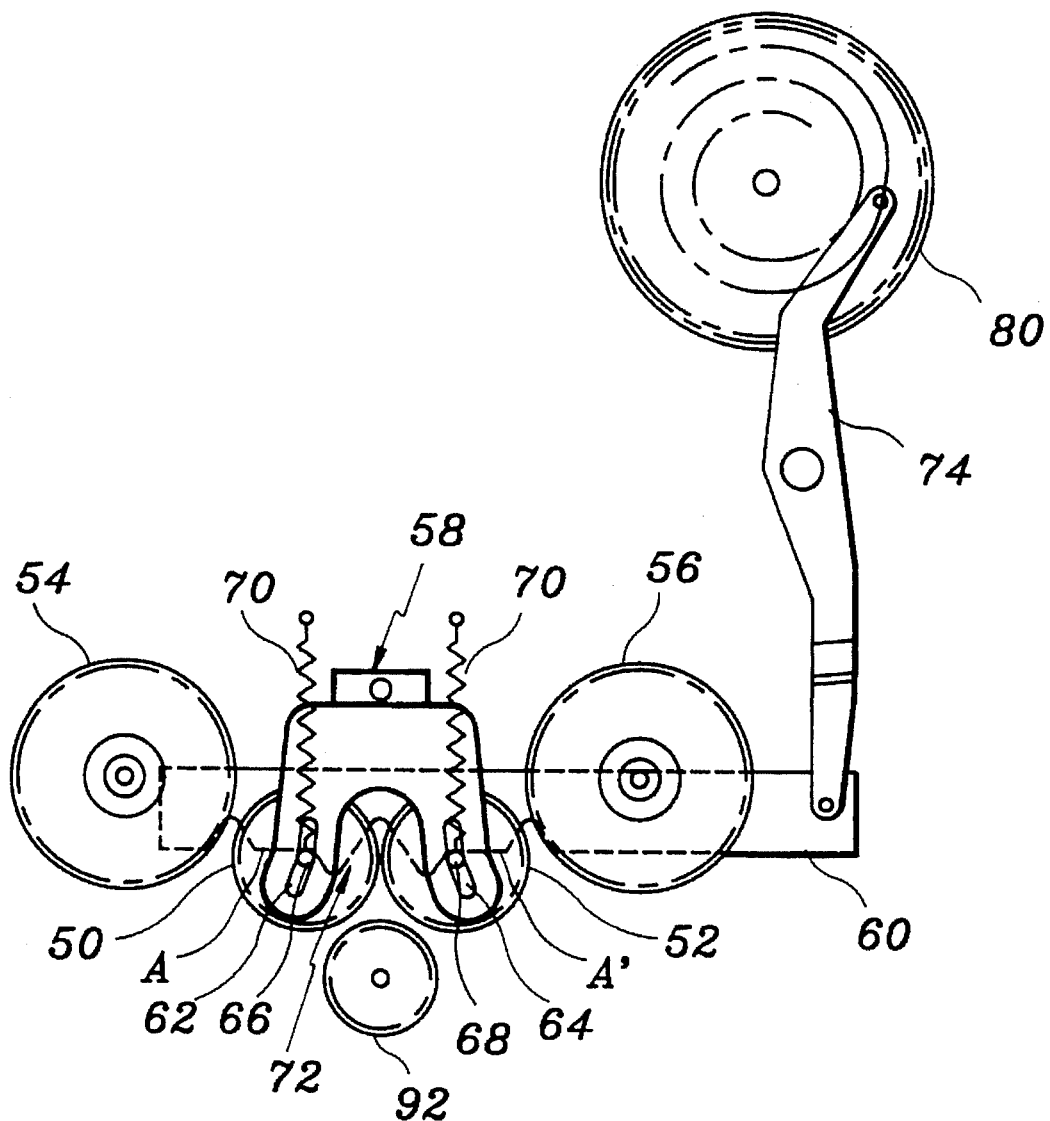
FIG. 5 shows a stop mode operation of the VCR, with a first and a second idlers of the driving apparatus depicted in FIG. 4 being disengaged from a supply and a take-up reel tables of the VCR and a drive gear of the driving apparatus.

In accordance with a preferred embodiment of the present invention, the operation of the reel table driving apparatus will now be described hereinbelow, with reference to FIGS. 5–8. FIG. 5 shows the stop mode operation of the VCR wherein the respective shafts 66,68 of the idlers 50, 52 are located at the stop mode positions A, A' of the camming faces 72 of the slide plate 60, thereby allowing the first and the second idlers 50, 52 to disengage from both the reel tables 54, 56 and the drive gear 92. As a result, the reel tables 54, 56 remain to be stopped in the stop mode operation of the VCR.

Figure 6:
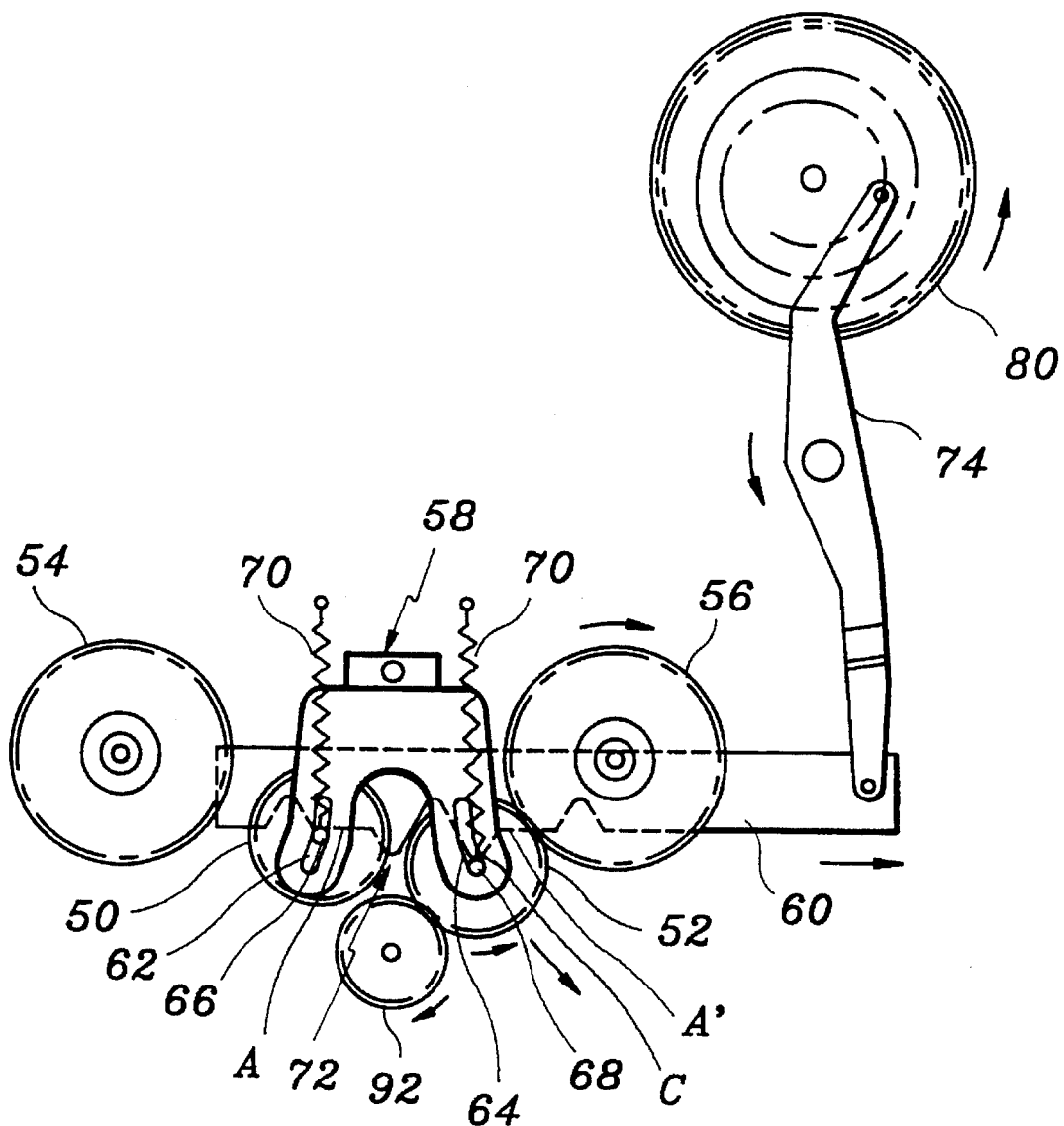
FIG. 6 illustrates the second idler shifted to drive the take-up reel table under a play or fast forward mode operation of the VCR.

As shown in FIG. 6, if it is required to switch the operation mode, e.g., from the stop mode to the play or fast forward mode, the counterclockwise rotation of the cam gear 80 will cause the slide plate 60 to move in the right+ direction via the swing lever 74. At this time, the shaft 68 of the second idler 52 moves downward along the curved slot 64 of the support plate 58 against the biasing force of the coil spring 70 and then is rested on the play and fast forward position C of the camming faces 72 of the slide plate 60, with the simultaneous engagement of the second idler 52 with the take-up reel table 56 and the drive gear 92. Accordingly, the take-up reel table 56 is driven by the capstan motor 84 via the second idler 52 to operate the VCR in the play or fast forward mode. However, the shaft 66 of the first idler 50 remains to be located at the stop mode position A of the camming faces 72 to thereby maintain the first idler 50 to be separated from the supply reel table 54 and the drive gear 92 during the play or fast forward mode operation of the VCR.

Figure 7:
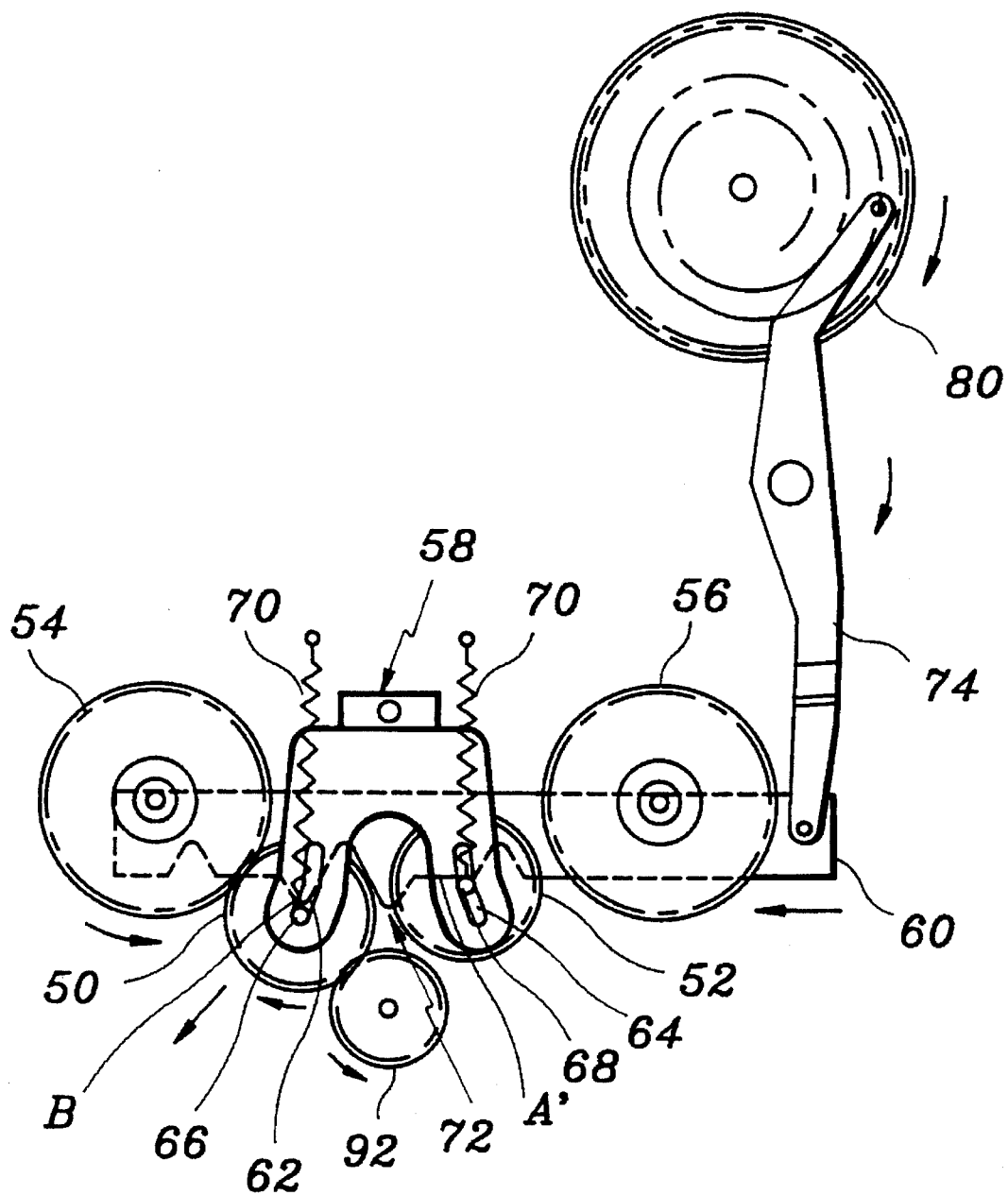
FIG. 7 represents the first idler shifted to drive the supply reel table under a review or rewind mode operation of the VCR.

In contrast with the above, as depicted in FIG. 7, in case of the review or rewind mode operation of the VCR, with the left movement of the slide plate 60 caused by the clockwise rotation of the cam gear 80, the shaft 66 of the first idler 50 reaches the review and rewind mode position B of the camming faces 72, and the shaft 68 of the second idler 52 rides on the stop mode position A' of the camming faces 72. As a result, the first idler 50 is lowered along the curved slot 62 of the support plate 58 against the biasing force of the coil spring 70 to thereby engage with the supply reel table 54 and the drive gear 92, while the second idler 52 becomes disengaged from the take-up reel table 56 and the drive gear 92. Therefore, the driving force of the capstan motor 84 is transmitted to the supply reel table 54 via the first idler 50 to attain the review or rewind mode operation.

In accordance with the preferred reel table driving apparatus of the present invention, since the idlers 50, 52 are actuated by the lateral movement of the slide plate 60, the capstan motor 84 and said one of the reel tables 54, 56 can be concurrently driven at the substantially same time as the completion of the shifting operation of the one of the idlers 50, 52, preventing the slackness of the loaded magnetic tape T during the switching of the operating mode.

Figure 8:
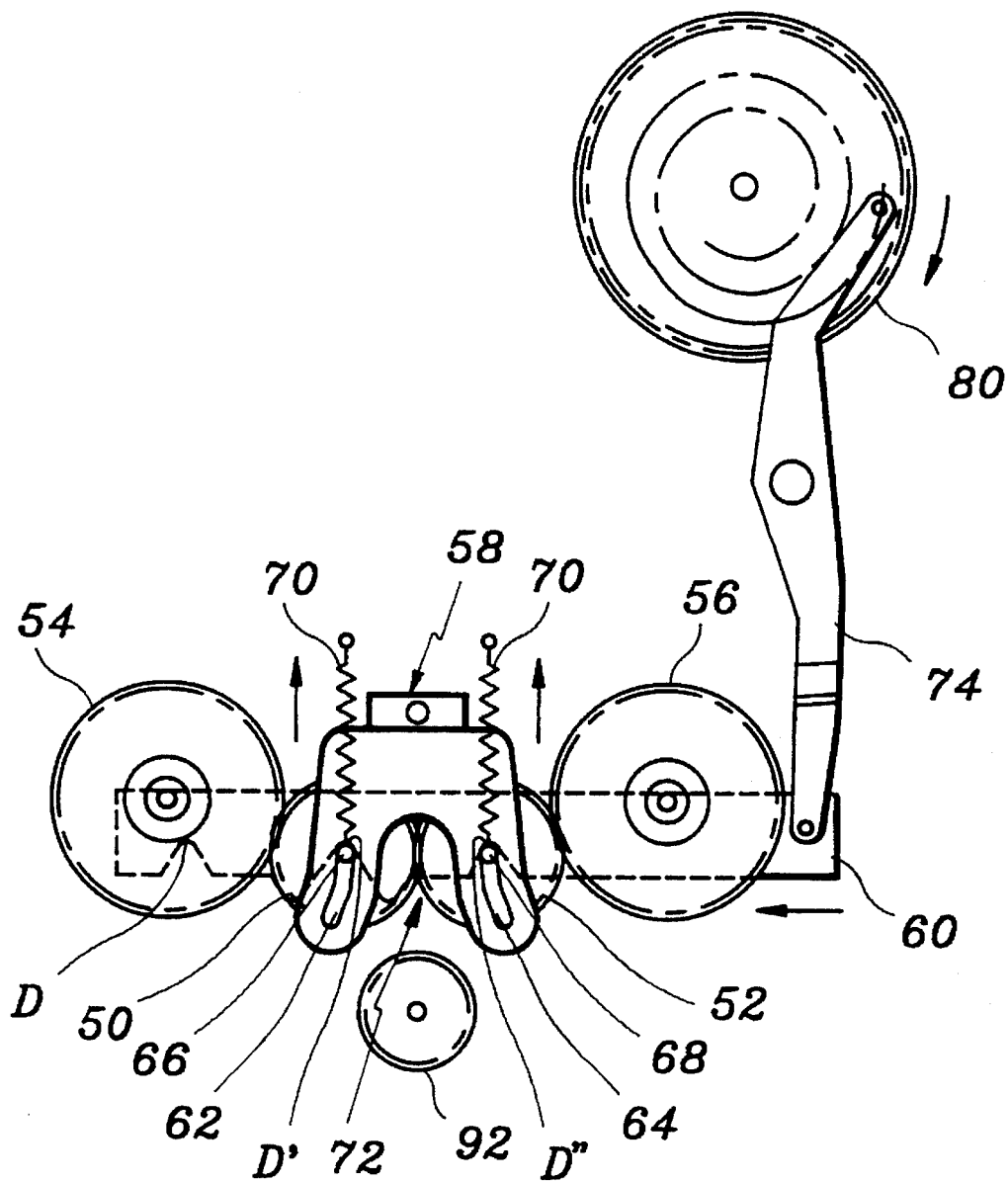
FIG. 8 depicts a braking operation of the driving apparatus used in the VCR, with the first and the second idlers being engaged with the supply and the take-up reel tables and interlocked together.

In addition, as represented in FIG. 8, in case of switching from the review or rewind mode to the brake mode, a further left movement of the slide plate 60 by the continuous clockwise rotation of the cam gear 80 will cause the shafts 66, 68 of the idlers 50, 52 to be located at the brake mode positions D', D" of the camming faces 72, enabling them to move upward along the curved slots 62, 64 of the support plate 58 by a restoring force of the coil springs 70. Therefore, the first and the second idlers 50, 52 are engaged with the supply and the take-up reel tables 54, 56, respectively, simultaneously with their interlocking connection to quickly brake the reel tables 54, 56 due to the counteraction of the idlers 50, 52. Also, at this time, the drive of the capstan motor 84 is stopped. Similarly, in order to change from the play or fast forward mode to the brake mode, moving of the slide plate 60 in a further right direction will cause the shafts 66, 68 of the idlers 50, 52 to be deviated from the stop mode position A and the play and fast forward position C of the camming faces 72 and then seated on the brake mode positions D, D', respectively, with the supply reel and the take-up reel tables 54, 56 being braked in the above mentioned manner. As discussed above, in accordance with the present invention, instead of the conventional braking mechanism, the idlers 50, 52 of the driving apparatus further function to brake the reel tables 54, 56, making the overall structure of the VCR more simplified and compact.

Although the present invention has been shown and described with reference to the particular embodiments, it will be apparent to those skilled in the art that many changes and modifications may be made without departing from the spirit and scope of the invention as defined in the following claims.

What is claimed is:

1. A video cassette recorder having a supply reel table and a take-up reel table rotatably mounted to a deck thereof, characterized by a reel table driving apparatus which comprises:

a first idler disposed adjacent to the supply reel table for a selective engagement with the supply reel table;

a second idler disposed adjacent to the take-up reel table for a selective engagement with the take-up reel table;

said first and second idlers arranged between the supply reel table and the take-up reel table for a selective engagement with each other and the supply and the take-up reel tables to brake the supply and the take-up reel tables;

means for driving one of the reel tables through one of said first and second idlers;

a support plate mounted to the deck for movably supporting said first and second idlers and individually guiding a movement of said first and second idlers to and from the reel tables and the driving means;

a slide plate slidably mounted to the deck for causing at least said one of said first and second idlers to selectively engage with and disengage from at least said one of the reel tables and the driving means; and means for biasing said first and second idlers against said slide plate so that shafts of said first and second idlers are in contact with a side of said slide plate.

2. The video cassette recorder of claim 1, wherein said driving means includes a drive gear arranged on the deck for a selective engagement with said one of the first and the second idlers through the movement of said one of the idlers toward the drive gear along said support plate caused by a sliding movement of said slide plate on the deck.

3. The video cassette recorder of claim 2, wherein said support plate includes a pair of generally curved slots arranged in a substantially opposite relationship with each other, which are adapted to accommodate the shafts of said first and second idlers therein, respectively.

4. The video cassette recorder of claim 3, wherein said slide plate includes a series of camming faces formed at the side of the slide plate, which define stop mode positions, a play and fast forward mode position, a review and rewind mode position, and brake mode positions.

5. The video cassette recorder of claim 4, wherein each of the shafts of said first and second idlers lies at one of the mode positions of the camming faces.

6. The video cassette recorder of claim 3, wherein said biasing means is secured to the respective shafts of said first and second idlers.

* * * * *